United States Patent

Narita

[15] 3,678,186

[45] July 18, 1972

[54] VIDEO TAPE RECORDER WITH SLOW MOTION REPRODUCING APPARATUS

[72] Inventor: Fujiaki Narita, Amagasaki, Japan

[73] Assignee: Sanyo Electric Co., Ltd., Moriguchi-shi, Japan

[22] Filed: Sept. 12, 1969

[21] Appl. No.: 857,504

[30] Foreign Application Priority Data

Sept. 14, 1968 Japan....................................43/66284

[52] U.S. Cl....................178/6.6 FS, 178/6.6 PS, 178/6.6 SF, 179/100.2 T

[51] Int. Cl.....................G11b 5/52, G11b 15/52, H04n 5/78

[58] Field of Search.......................178/6.6 A, 6.6 FS, 6.6 SF; 179/100.2 T

[56] References Cited

UNITED STATES PATENTS 3,376,395 4/1968 Rumple.............................178/6.6 FS 3,157,739 11/1964 Okamura............................178/6.6 A

*Primary Examiner*—Howard W. Britton

*Attorney*—Darby & Darby

[57] ABSTRACT

Video tape recorder with slow motion reproducing apparatus comprising rotating main and sub-heads scanning slant-wise over a tape which is transported in a longitudinal direction.

During normal speed reproduction, output signals reproduced by two of the heads tracing the recorded tracks are used to compose full or false field video signals.

During slow motion reproduction, output signals are produced by the main heads retracing on the same track of the tape n times while the tape is transported at a speed of (1/*n*) that of recording and output signals are produced by the subheads which are switched into operation to replace the main heads while the main heads retrace on the guard band between adjacent tracks of the recorded video signals. The subheads are so disposed at the periphery of a rotary member in relation to the main heads so that they retrace a track completely while the main heads retrace the guard band. Apparatus is also provided to shift the tape upward or downward across its width to compensate for the head tracking error which occurs when the tape reproduction speed is slowed down from normal speed to that for slow motion reproduction.

13 Claims, 14 Drawing Figures

INVENTOR.
FUJIAKI NARITA

INVENTOR.
FUJIAKI NARITA

*INVENTOR.*
FUJIAKI NARITA

INVENTOR.
FUJIAKI NARITA

INVENTOR.
FUJIAKI NARITA

INVENTOR.
FUJIAKI NARITA

VIDEO TAPE RECORDER WITH SLOW MOTION REPRODUCING APPARATUS

RELATED APPLICATIONS

Applications Ser. No. 857,323 filed concurrently herewith in the name of FUJIAKI NARITA entitled "Servo Control System For Video Tape Recorder With Slow-Motion Reproducing Capability", now U.S. Pat. No. 3,573,361, dated Apr. 6, 1971 and Ser. No. 857,358 filed concurrently herewith in the name of SOJI NAKAMOTO and entitled "Video Tape Recorder With A Still Reproduction Device", now U.S. Pat. No. 3,606,205, dated Sept. 20, 1971, both of which are assigned to the assignee.

BACKGROUND OF THE INVENTION

The present invention relates to video tape recorders and more particularly to a video tape recorder of the so-called "slant scan type" having the capability of reproducing a complete slow motion picture.

Prior art slant scan type video tape recorders generally accomplish slow motion reproduction by operating the tape transporting means at a speed which is $1/n$ that of the recording, where $n$ is an integer from 2 to 12 (usually 4 to 6), and reproducing the same track $n$ times to provide the necessary field signals. In such prior art devices a problem arises in reproducing the slow motion picture since noise and beat signals are produced when the head is retracing the "guard band" between adjacent tracks of the recording. The problem is due in large measure to the tracking error of the recorded tracks since there is usually a slight difference in the angle between the recorded track and the plane of rotation of the reproducing heads. These noise and beat signals generally occur one or two times per $n$ retraces and therefore give a poor quality picture as compared with that produced at normal reproduction speeds.

In view of the foregoing, it is therefore an object of the present invention to provide a slant scan type video tape recorder with slow motion reproducing capability which can reproduce slow motion pictures with the noise and beat signals substantially reduced from that of prior art devices.

Another object is to provide a slant scan type video tape recorder employing the so-called "field skip" recording/reproducing method with slow motion reproducing apparatus capable of reproducing slow motion pictures containing substantially no noise and beat signals.

A further object is to provide a slant scan type video tape recorder employing the so-called "full field" recording/reproducing method with slow motion reproducing apparatus capable of reproducing slow motion picture containing substantially no noise or beat signals.

Still another object is to provide a video tape recorder with slow motion reproducing apparatus capable of reproducing slow motion pictures with high quality in which the recorder includes a tape transporting mechanism for slowing down the tape speed during reproduction to a ratio of from half to one-twelfth that of recording; a tracking error compensating mechanism to shift the tape along the direction of its width and to locate the recorded track on the tape in the same plane as that of the locus of the rotary head during retracing; and means for keeping the rotary phase of the heads substantially constant referred to a slow motion control signal which is reproduced from a slow motion control track recorded at a frequency which is a multiple $n$ of a standard control signal recorded on the tape.

More specifically, it is an object of the present invention to provide a video tape recorder with slow motion reproducing apparatus to reproduce slow motion pictures with high quality, comprising a tape slow down mechanism which moves the tape at a speed ratio of from half to one-twelfth the speed of the tape during recording and normal speed reproduction; a tracking error compensating mechanism to shift the tape up or downward across its width and to arrange the recorded track on the tape in the same plane as that of rotary head retracing locus, rotary head control means for keeping substantially constant the rotary phase of the heads referred to slow motion control signals that are reproduced from a slow motion control track which are recorded at a rate which is an integral multiple $n$ of standard speed control signals also recorded on the tape, one or a pair of subheads located so as to be able to trace a recorded track completely when the corresponding main heads trace the guard band between adjacent tracks, and switching means for selecting the output of the head tracing the recorded track.

Prior art slant scan type video tape recorders reproduce a slow motion picture with the heads retracing $n$ times the same recorded track of the tape which is transported at slow speed $1/n$ the normal speed. However, such reproduced slow motion pictures contain many noises. Several examples of the general types of slant scan video tape recorders available for home and industrial use are shown in "Electronics World" published in May 1966, though these recorders are not equipped for slow motion reproducing. The present invention is useful with all of the recorders in the aforesaid article including the so-called full helical type video tape recorders, with only one main rotary head; half helical type video tape recorders, with two main rotary heads; and also ($360°/n$) ($n$=integer) deduced helical type video tape recorders, with $n$ main rotary heads. The subject invention finds particular use with so-called half helical slant scan type video tape recorders, and the specific explanation of the embodiment will be described with respect to such a video tape recorder.

The present invention also provides advantageous effects on both "full field" type and "field skip" type video tape recorders. A "full field" type system comprises recording both the odd and even fields forming a frame of the video picture completely and reproducing them in order. The "field skip" recording and reproducing system includes recording only one (the odd or the even) of two fields constituting a frame and reproducing the same recorded track corresponding to the one field twice by two heads disposed in such relation that one of the heads traces the same track followed by the other one during another half rotation of the rotary member carrying the heads and the outputs of both heads are combined to produce continuous signals. One of the heads reproduces a "false field", that is, the second reproduction of the same field is not really the field constituting the true frame of the video signal.

In the present invention, a novel system is provided in which, during recording, vertical synchronizing signals separated from the video signals are recorded as standard control signals and these control signals are used for reproduction. At the same time, slow motion control signals, which are $n$ times the frequency of the vertical synchronizing control signals are recorded. Both control signals may be recorded on the same track at different levels and reproduced separately. However, to ensure good separation between the two signals it is preferable to record them on separate tracks. Three or four rotating heads are used, these comprising two main heads and one or two subheads. An arrangement is also provided whereby complete and natural continuous reproduction of a picture is obtained during slow motion reproduction by minimizing the tracking error between recorded tracks and the locus of the rotating heads through an adjustable guide which shifts the position of the tape. Also, the heads are rotated at a constant speed under the control of a slow motion servo control loop whereby the period from the time of control signal (vertical synchronizing signal) reproduction to the time when the main head traces the guard band between one track and adjacent track is controlled and at that time an output signal from a subhead is switched to add to the output signals of the main heads.

The present invention will be better understood from the following description taken in connection with the accompanying drawings in which.

Figure 4A:
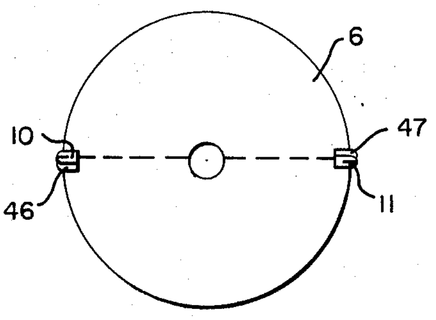
Figure 5A:
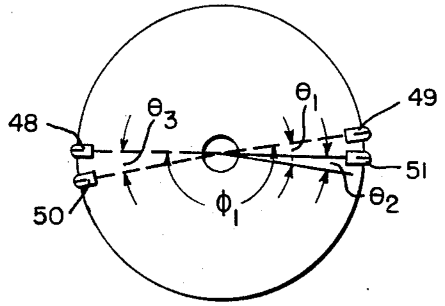
Figure 4B:
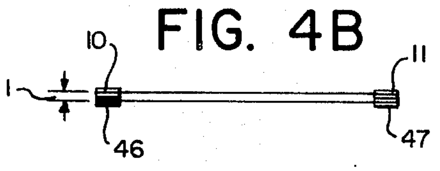
Figure 5B:
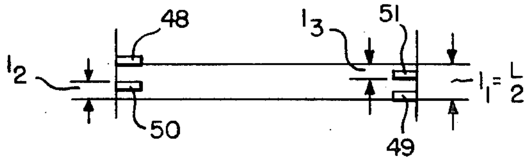
Figure 6:
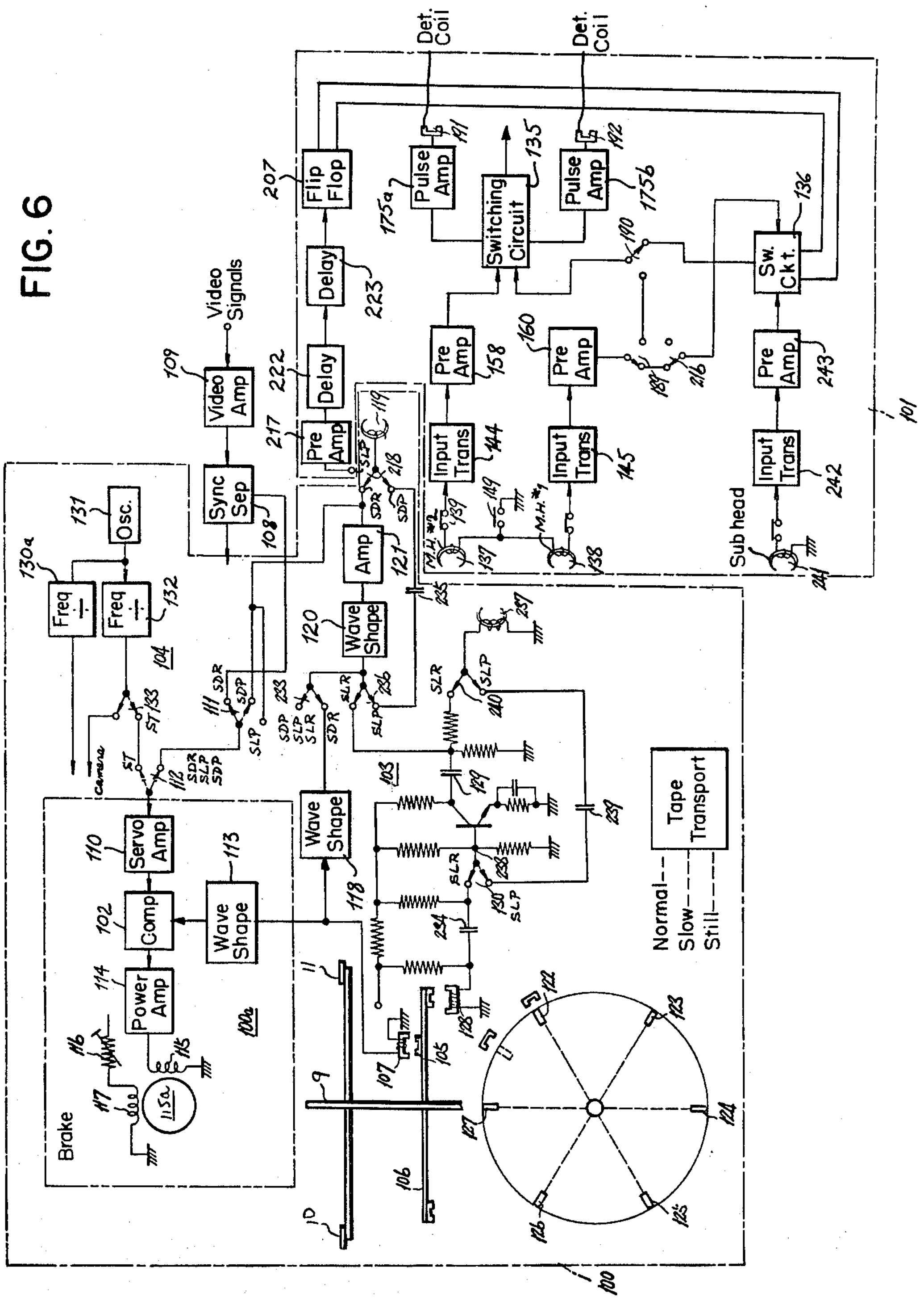
Figure 7:
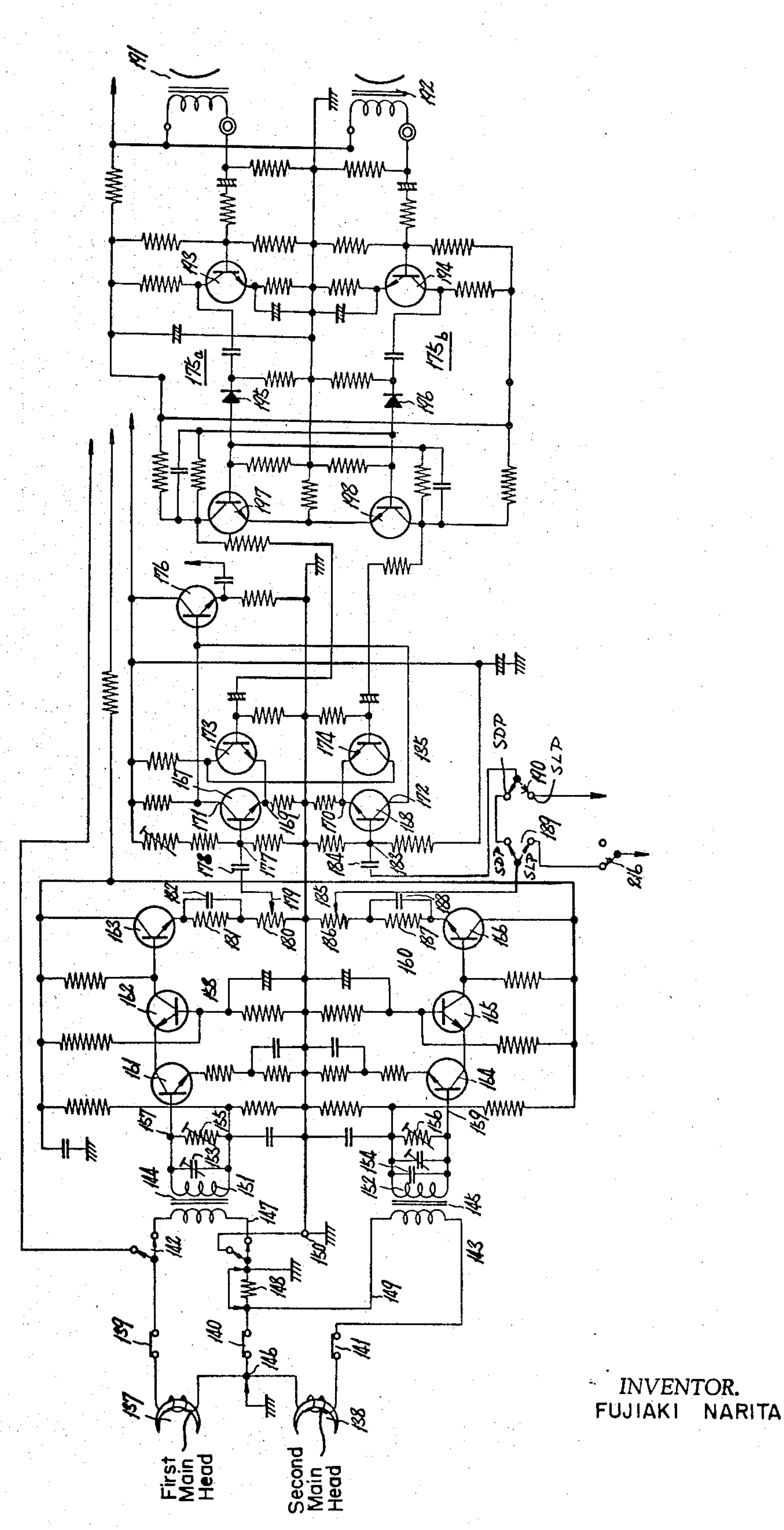
Figure 8:
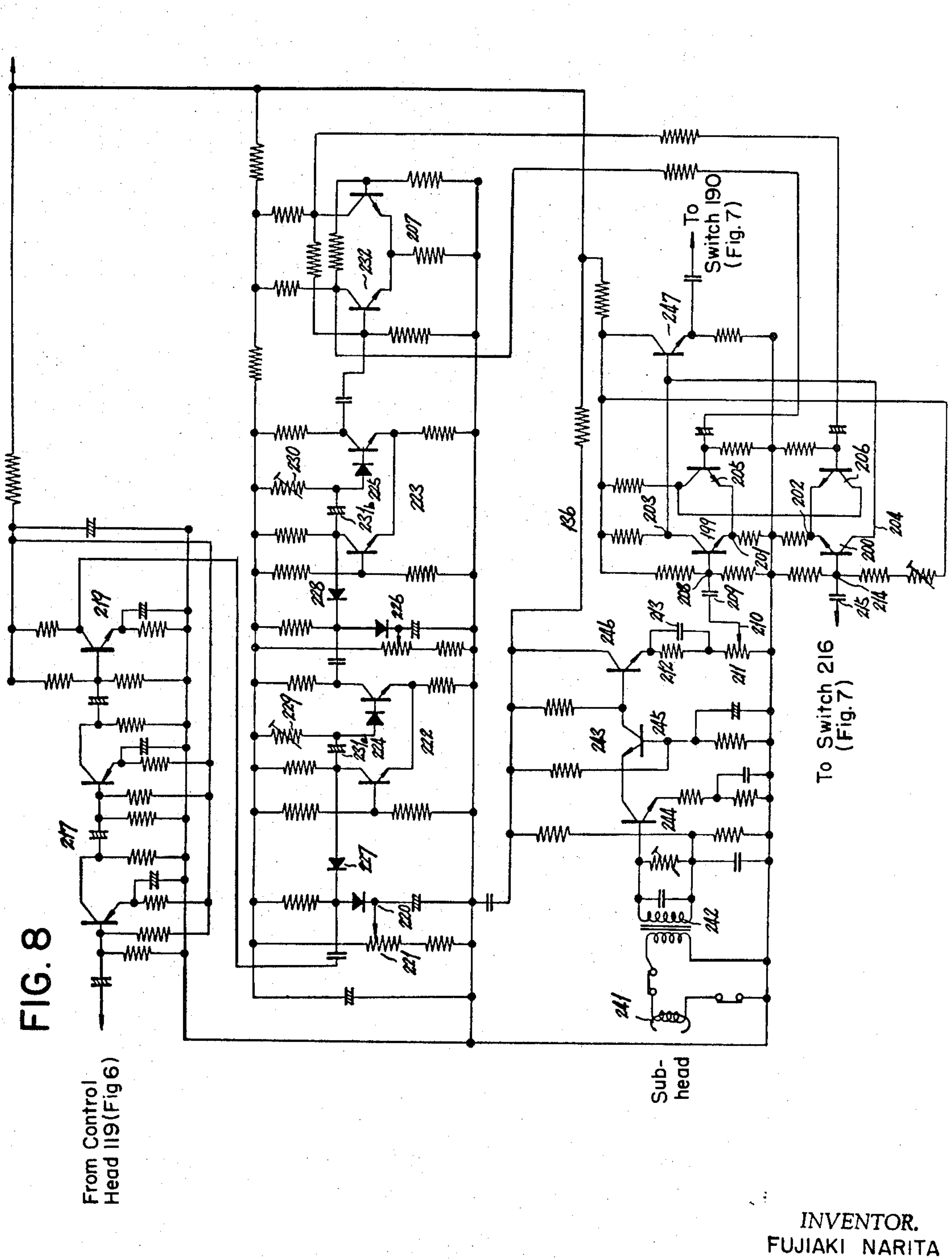

FIG. 4(*a*) and (*b*) are schematic views showing the disposition of the main and subheads of a recorder of the "full field recording and reproducing" type;

FIG. 5(*a*) and (*b*) are schematic views showing the disposition of the main and subheads of a recorder of the "field skip recording/reproducing"type;

FIG. 6 is a schematic block diagram of the slow motion servo system and switching system according to the present invention;

FIG. 7 is a schematic diagram of one type of electrical switching circuit for the present invention;

FIG. 8 is a schematic diagram of another type of electrical switching circuit for the present invention; and FIG. 9A – 9D show schematically the operation of a main and a subhead.

Figure 1:
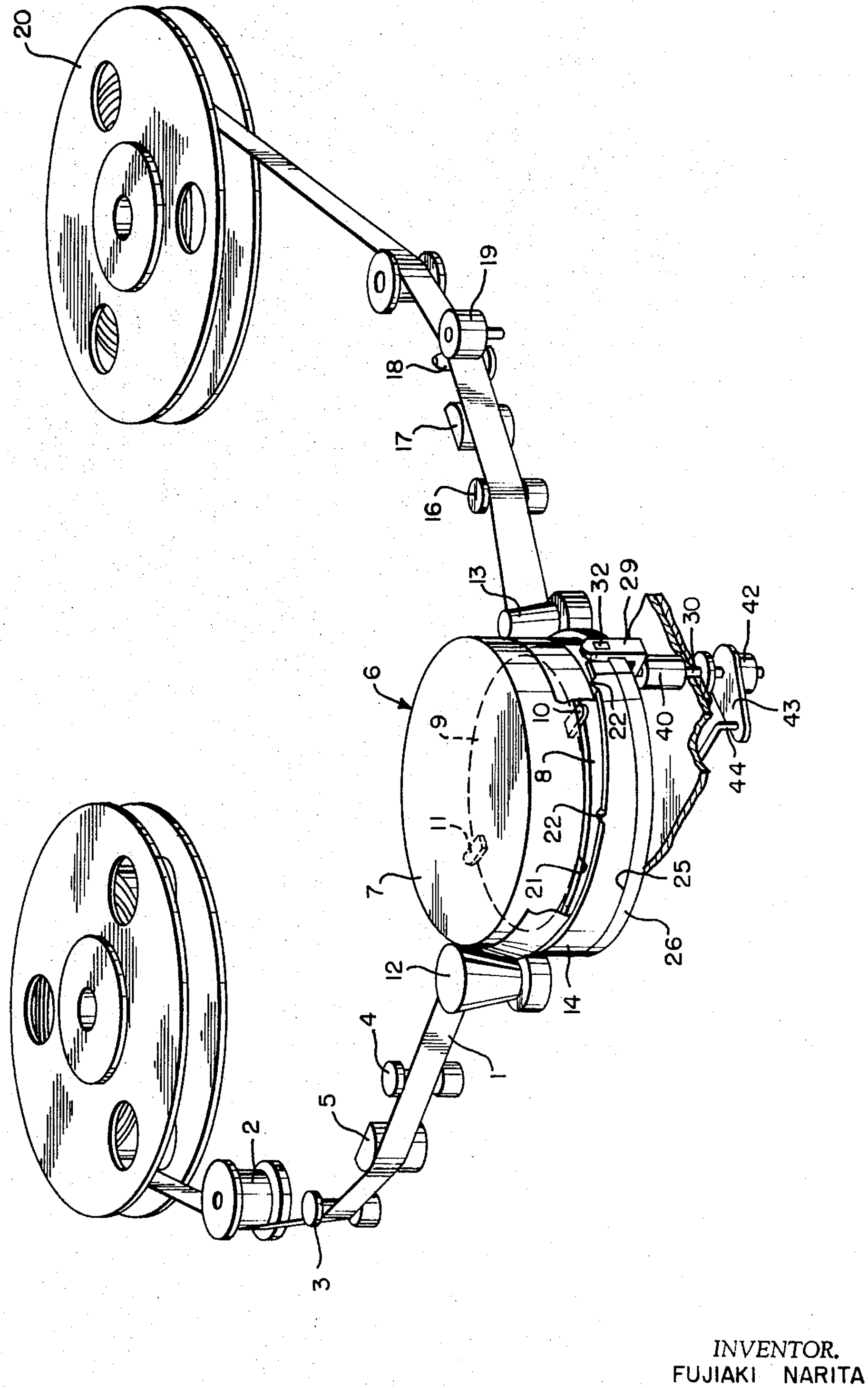
FIG. 1 is a perspective view of a tape transporting mechanism embodying the present invention.

FIG. 1 shows the magnetic tape transporting system of a helical scan type magnetic tape recording and reproducing system for handling television signals. In FIG. 1 a magnetic tape 1 is transported by a roller 2 driven at constant speed inertia to an erase head 5 located between first and second tape guides 3, 4. If desired, a pressure plate can be located at the erase head to ensure that the tape is properly held against the head so that previously recorded signals can be erased. After passing head 5 the tape 1 is wrapped around a stationary upstanding guide cylinder 6 which is formed into upper and lower halves 7,8 having a central circumferential opening within which rotates at least a pair of peripheral transducers 10,11 carried by a rotary member 9. The rotary member 9 is driven by a motor which is controlled directly or indirectly by a servo system in accordance with the present invention. Neither the motor nor the servo system are shown in FIG. 1.

The initial contact of the tape onto the guide cylinder 6 and the removal are smoothly accomplished by a pair of cone shaped guides 12,13, the surfaces of which form guide surfaces for the tape. The entrance guide 12 is disposed upside down with respect to the exit guide 13 so that the surface diameter of guide 12 increases toward the top of the guide cylinder 6, while the surface diameter of guide 13 increases toward the bottom of cylinder 6. A longitudinal tape guide 14 is mounted on the surface of the lower half 8 of the guide cylinder 6 to support and guide the bottom edge of the tape and ensure that the tape passes through with a determined relative slant angle between the circular path of the heads and the tape.

A tracking error compensating device 15 is located adjacent the guide cylinder near the exit part of the longitudinal tape guide 14 for correcting for any tracking angle error between the slant angle of recorded track on the tape and the circular path of the heads. This error should be cancelled in slow motion reproduction. The tape exiting the cylinder from the cone shaped guide 13 is maintained level by a tape guide roller 16 having parallel heads spaced apart by approximately the width of the tape. Roller 16 holds the tape in contact with a magnetic head, or multi-head 17, for recording and reproducing an audio signal and one or more control signals. The tape is transported at a constant speed by a capstan roller 18 and a pinch roller 19, and is wound onto a take up reel 20 which has a suitable friction mechanism (not shown) to keep the tape under proper tension.

Figure 3:
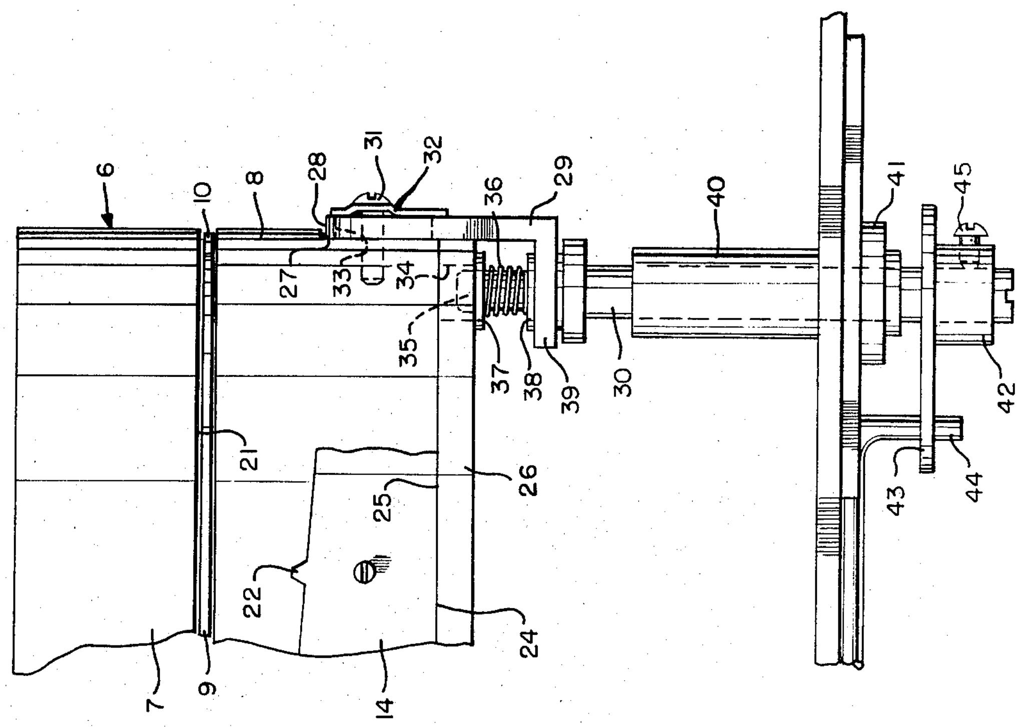
FIG. 3 is a side view of the tracking error compensating mechanism of FIG. 2.
Figure 2:
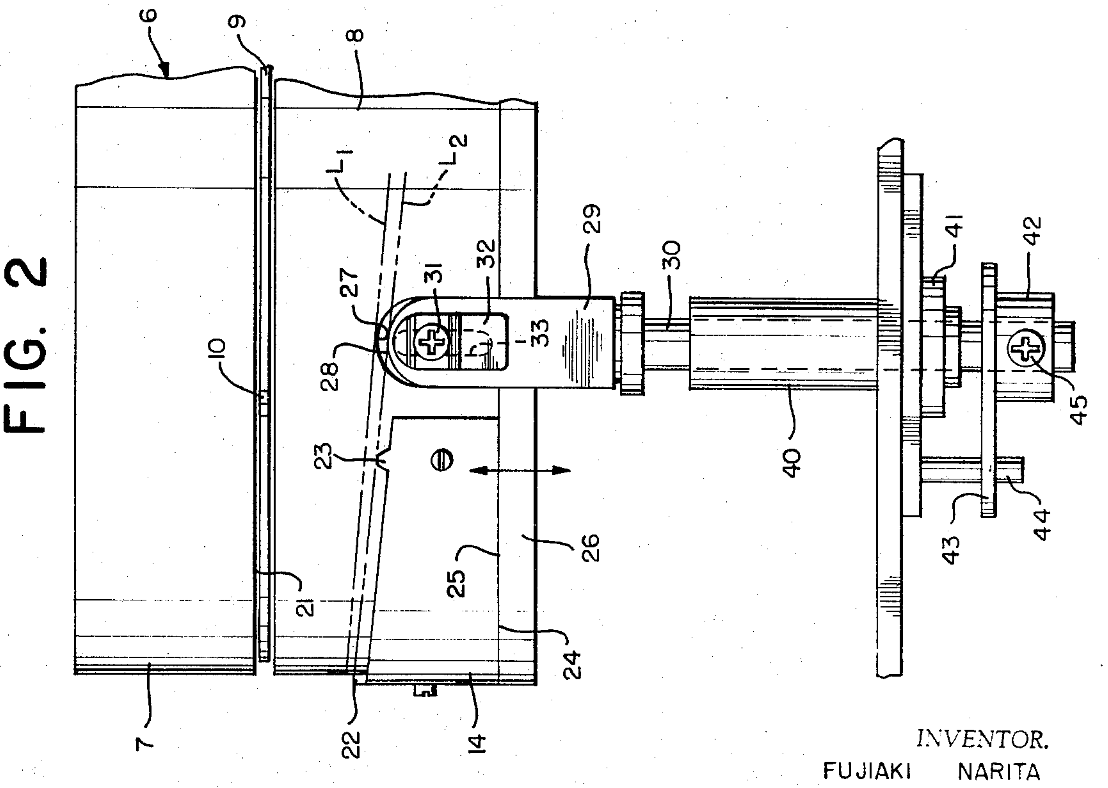
FIG. 2 is a front elevational view of a main part of the tracking error compensating mechanism.

The details of the tracking compensating device 15 will be fully understood by referring to FIGS. 2 and 3. The stationary upstanding cylinder 6 is shown with the central circumferential recording gap 21 in which rotates several (three or four) heads. The longitudinal tape guide 14 mounted on the outer surface of the lower half 8 of the guide cylinder, has a straight bottom edge 24 which is adjacent to or in contact with the top edge 25 of a circular bottom 26 on the lower half of the cylinder. The upper edge of the tape guide 14 is inclined at a predetermined angle A to the circumferential gap 21. The guide 14 is made of a thin plate of metal or synthetic resin with several upstanding tape guide pins 22,23 on its inclined top edge. Adjacent to the exit guide pin 23 of the longitudinal tape guide 14 in the surface of the lower half of the guide cylinder, there is formed a guide slot 27 in which a moving guide member 28 slides up and down. The moving guide 28 includes an "L" shaped piece 29 supported by a shaft 30 which has a threaded lower end. The upper end 28 of the piece 29 has an oblong cutout 33 and a flat spring 32 held by a screw 31 which passes through cutout 33 and is fastened to the cylinder, permitting the piece 28 to slide in the slot 27. A cavity 34 is formed in the bottom of the lower cylinder plate 26 to guide a top part 35 of the shaft 30 only in a direction perpendicular to the bottom surface of the guide cylinder. A coil spring 36 is inserted between a flange bearing 37 on the bottom face of cylinder 6 and a washer 38 on the short leg 39 of the "L" shaped guide piece to urge the guide piece 29 and the shaft 30 downwardly. The threaded lower part of the shaft 30 is threaded within a collar 40 whose lower end is screwed into a guide nut 41 mounted on a plate. The lower end of shaft 30 has a rotary shift member 42 connected to it by a set screw 45. The shift member 42 has a fork shaped plate 43 for engaging a lever 44, which rotates the shift member.

For normal speed reproduction, the upper end 28 of the "L" shaped guide 29 is located at a place where there is only a small space between the bottom edge of the tape and the guide end 28. The broken line L2 of FIG. 2 shows the tape path during normal reproduction, and it should be noted that the tape engages guide pin 23. In other types of reproduction, such as slow and still motion, where the tape travel speed is reduced or even stopped, the rotary shift member 42 is shifted by the lever 44 and rotates the shaft 30 counterclockwise to push up the "L" shaped tape guide piece 29 a small amount, for example, a height of 100–200 microns. This moves the tape upwardly by about the same amount so that the tracking error angle is cancelled. The level of end 28 of the "L" shaped tape guide piece in this position is shown by the chain line L1 where it can be seen that the end 28 engages the tape 1 instead of the guide pin 23. The original relative position of the shaft 30 may be easily adjusted by loosening the set screw 45 and turning the threaded shaft. The pitch is selected so that when the shift member is rotated about 60–90° the "L" shaped tape guide piece 29 rises in the guide slot 27 about 100 microns.

Typical mechanical parameters for the tape recorder of the subject invention are as follows:

| | |
|---|---|
| diameter of cylinder guide 6: | 151.0 mm |
| width of a tape: | ½ inch |
| tape speed : (in recording and normal reproduction) | 19.5 cm/sec. |
| (in slow motion reproduction) | 3.25 cm/sec. |
| relative slant angle: (in normal reproduction) | 2°3′58″ |
| (in slow motion reproduction) | 2°5′58″ |

Thus, the shift of the tape by the piece 29 should be sufficient to compensate for the two minute changes of angle.

As mentioned heretofore the present invention is useful for video tape recorders of the "field skip" type as well as the "full field" type. For a further explanation of the "field skip" type system reference is made to U.S. Pat. No. 3,391,248.

FIGS. 4(*a*) and (*b*) show the disposition of the main heads 10,11 and subheads 46,47 of an apparatus of the "full field recording/reproducing" type in which the first and second main heads 10 and 11 are mounted on a rotating member (not shown) symmetrically with respect to the center axis of the guide cylinder 6. First and second subheads 46 and 47 are located in the same plane, which is illustratively in a plane below that of the main heads 10 and 11, spaced so that the subheads can trace a recorded track completely when the corresponding main heads trace the guard bands between adjacent recorded tracks. The two sets of main and subheads are located with the distance *l* between them. Both are rotated by a common carrier such as 9 of FIG. 1 (not shown). It is also possible in the present invention to locate the subheads at a place where they completely trace an adjacent track on the tape when the main heads trace guard bands, though the subheads are mounted at an angle $\theta$ with respect to the corresponding main head in the two different planes of rotation, that is, the main and subheads are not on the same diametrical line.

FIGS. 5(*a*) and (*b*) show the location of the main heads 48,49 and subheads 50,51 of a so-called "field skip" type video tape recorder. In the field skip type, one of the main heads 48 or 49 used in normal speed reproduction does not operate as a main head in slow motion reproduction. Also, in field skip apparatus only one of two (odd or even) field signals is recorded and the same recorded track is traced twice by the main and subheads to compose a signal to resemble a continuous interlaced television signal. For this purpose, in FIGS. 5(*a*) and (*b*) the first and second main heads 48 and 49 are located to have the following relationships.

The second main head 49 is disposed at an angle $\phi_1$ to the direction of the motion of rotary member, wherein:

$\phi_1 = 180 + \theta_1$ $$\theta_1 = \frac{P}{\pi D} \pm \frac{1+2K}{2a}, \text{ where}$$

$P$ = shifted distance between adjacent recorded tracks in the direction of recording.

$D$ = diameter of the guide cylinder.

$K$ = an integer.

$a$ = frequency of the horizontal sweep.

The distance between both main heads 48,49 in the direction of the cylinder axis is $l_1 = (L/2)$ which is one half of distance L between adjacent recorded tracks on the tape, that is, the two heads are not coplanar.

Figures 9A, 9B, 9C, 9D:
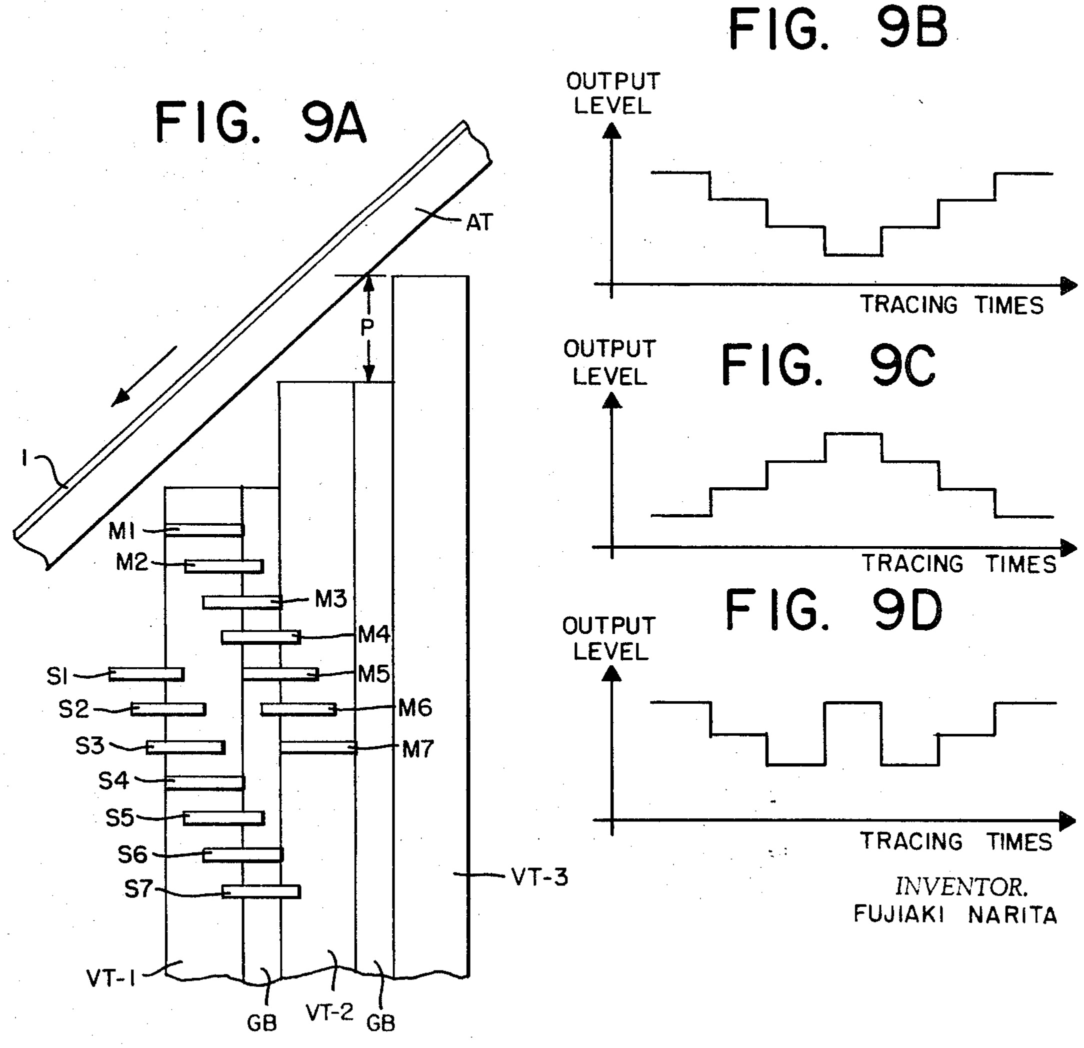

To explain the need for the subhead or subheads reference is made to FIGS. 9A–9D. In FIG. 9A the video tracks VT are shown at a slant angle to the audio track AT along the edge of the tape 1 whose direction of travel is shown by the arrow. Adjacent video tracks are separated by guard bands GB. During slow motion reproduction the tape speed is slowed down while the speed of the head remains the same. Thus, the main head cannot scan a complete trace. The reference numerals M-1 through M-6 in FIG. 9A indicate the position of a main head with respect to VT 1 during slow motion reproduction and the same reference numerals in FIG. 9B indicate the amplitudes of the output signals from the main head at these times. Note that at M-4 the output level of the main head is minimum, when most of the head is in the guard band GB. This gives rise to the noise and beat signals.

The reference numerals S-1 through S-6 indicate the positions of a subhead with respect to VT-1, with the subhead located in accordance with the invention. In FIG. 9C the amplitudes of the output signals of the subhead are shown for the corresponding subhead positions. Note that subhead output signal is maximum at S-4 the same time that M-4 is minimum. If the S-4 signal from the subhead were used instead of the M-4 signal then the composite signal of FIG. 9D is obtained. In the present invention, the subhead is properly arranged with respect to a main head and the subhead output signal is switched to replace that of the main head at the M-4 time. That is, when a main head is tracing a guard band GB a subhead is tracing the recorded track and the subhead output signal is substituted for that of the main head.

In slow motion reproduction in a field skip type system such as shown in FIG. 5, three or four heads are used, two of them are used as the main heads and the other or other two of them are used as subheads. For example, one of the main heads (e.g. 49) used in normal speed reproduction, is used as a subhead correlated with a new added subhead (e.g. 50). The other new added subhead (e.g. 51) is used as main head in slow motion reproduction. For the convenience of description the added subhead 51 which is used as one of main head in slow motion reproduction, is called "the second slow motion main head" and the main head (e.g. 48) which is still used as a main head is called "the first slow motion main head." The second slow motion head (original subhead 51) is located with respect to the first slow motion main head 48 in the relation as said first and second main heads 48,49 in normal speed reproduction. It is, however, more preferable to dispose the second slow motion main head 51 at a retrace angle $\phi_2$ in the direction of rotation of the rotary member 9 to the first slow motion main head 48 and with a distance $l_2$ in the direction of the axis of rotation.

$$\phi_2 = 180° + \theta_2$$

$$_2 = (\theta_1/n),\ l_2 = (l_1/n)$$

rc $n$ = slow down ratio.

The necessity of these conditions will be understood by recalling the relationship between the first and second main heads 48,49 of a field skip type video tape recorder. In slow motion reproduction the first slow motion subhead 50 is disposed to the second slow motion subhead 49 in the same relation as the second slow motion main head 51 to the first slow motion main head 48. First slow motion subhead 50 retraces the recorded track that the second slow motion main head 49 should trace when it traces a guard band between adjacent recorded tracks. The detailed position of the first slow motion subhead 50 is defined below. The angle $\theta_3$ between the first slow motion subhead 50 and the first slow motion main head 48 is $\theta_1 - \theta_2$ and the distance $l_3$ is $l_2$ in the direction of axis. The dimension of the devices embodying the present invention is exemplarily described hereunder:

tape speed $v$ = 190.0 mm/sec diameter of the cylinder $2R$ = 151.0 mm 1 frame equals 2 fields: there are 30 frames/sec frequency of horizontal sweep: 30 × 525 cycles/sec = = 15,750 cycles per second $\theta_1 = 2.76°$ $\theta_2 = 0.46°$ $\theta_3 = 2.30°$ $l_1$ = 117.6 microns $l_2$ = 19.6 microns $l_3$ = 19.6 microns A block diagram of the slow motion servo and switching system for the present invention as used in both a field skip type of system and a full field system is shown in FIG. 6. In FIG. 6 the main components of the block diagram are divided into two parts: a rotary head servo control system 100 and a switching system 101. Furthermore, the rotary head servo control system comprises a basic servo control system 100*a*, a slow motion servo control system 103, and a still servo control system 104. The function of the basic servo control system 100*a* is a closed control loop to control the rotary phase of the magnetic heads during reproduction to maintain the same phase as that of recording so that the recorded picture will be accurately reproduced. The operation of the system is generally described below. The letters opposite the system operating mode refers to the setting of the switches.

1. STANDARD SPEED RECORD (SDR)

During this mode of operation the picture to be recorded is produced for example by a recording. Standard control signals are also produced for recording of the tape for subsequent use during standard speed reproduction or playback (SDP).

A magnetic piece 105 is mounted on a disc 106 which rotates on the same axis as the rotary member 9 carrying the recording heads and forms, with a detecting coil 107, a rotary phase detector which produces output pulses each time piece 105 passes pickup 107. A vertical synchronizing signal is separated in a vertical synchronizing signal separating circuit 108 from the video signals to be recorded which are supplied by a video amplifier 109. The vertical signal is applied to a servo amplifier 110 by way of the first and second switches 111,112 when in the solid line position (SDR) shown. The induced signals in the detecting coil 107 are applied to a wave shaping circuit 113 whose output signals are compared with the vertical synchronizing signals from amplifier 110 in an error detecting circuit 102, which can be a conventional phase discriminator. The servo amplifier 110 includes a pulse amplifier circuit and a one shot multivibrator which has a time constant $t$ of $1/60 < t < 1/30$. This enlarges the width of the vertical sync pulses to aid in the comparison. An error signal, which is in proportion to the difference in phase between the two signals is applied from the error detecting circuit 102 to a control power amplifier 114 whose output is supplied to a coil 115 of a magnetic brake controller which is associated with a motor 115*a* which drives shaft 9. A constant current, adjusted by variable resistor 116 connected with power source, is supplied to the other magnetic brake coil 117. The brake controls the motor speed in response to the error signal from amplifier 114 so that the heads (main heads 137 and 138, being shown) are in phase with the vertical sync signals.

At the time that normal recording is taking place, the standard control signals are being produced. To do this, the output signals of the detecting coil 107, which are synchronized to the vertical sync signals, are also shaped into signals of one polarity by a pulse shaping circuit 118 and applied through a switch 233 to a control head 119 by way of a second wave shaping circuit 120 and an amplifier 121. These signals are recorded on the control track of the tape during recording. This track is also preferably longitudinal of the tape so that head 119 can be stationary.

Also during standard speed recording (SDR) the slow motion control signals are being produced for recording on the tape. This is accomplished by mounting on the periphery of the disc 106 opposite the magnet 105 ($n$), six magnetic pieces 122, 123, 124, 125, 126, 127 at an angle of $360°/n$ or 60°, with one another. Adjacent to the rotating plane of the six magnetic pieces is a detecting coil 128, the output signals of which are differentiated by RC circuit 234 and applied to a pulse amplifier circuit 129 operated in class A bias through a switch 130 set in the upper position (SLR) shown in recording. The system has no slow speed recording mode. However, the legend SL (slow speed) is used for the portions of the system which operate to produce slow speed functions. These control signals produced by the six magnetic pieces are the slow motion control signals and are applied through a switch 240 in SLR position to a control head 237 for recording on the tape. The slow motion control signals and the standard control signals are recorded on two individual tracks or on the same track as a mixed signal with opposite polarities and are reproduced separately in normal and slow motion reproduction. It should be noted that the recorded slow motion control signals have a rate of $n$ times the recorded standard speed control signals, $n$ being six in the example described.

2. NORMAL MOTION REPRODUCE (SDP)

During normal speed reproduction, the heads are rotated at normal speed. The standard control signals reproduced from the tape by control head 119 in the form of differentiated pulses are provided to the wave shaping circuit 120 through a coupling capacitor 235 by way of two switches 218,236, set in the normal speed reproducing position (SDP). The output pulses of amplifier 121 are applied to the servo amplifier circuit through the first and second switches 111,112, both of which are set in the SDP position. The operation of the basic servo system is similar to that of recording except that reproduced control signals are used to control the brake 115 to maintain the proper rotary phase of the drum instead of vertical sync signals.

3. SLOW MOTION REPRODUCE (SLP)

In slow motion reproduction, the tape is transported at $1/n$ of the normal speed so that the slow motion control signals recorded by control head 237 are reproduced as reference control signals at the same frequency as the control signals reproduced in normal reproducing. Induced pulses from the slow motion control head 237, which are differentiated signals from the recorded series of pulses, are provided to the base 238 of the pulse amplifier transistor 129 through a coupling condenser 239, and two switches 240,130 set in the slow motion reproducing position (SLP). The pulse amplifier transistor 129 is now biased class B or C, by the disconnection of the bias resistor to the right of reference numeral 234 and amplifies the induced pulses selectively into shaped pulses of a single polarity. The output pulses from the pulse amplifier 129 are applied to the wave shaping circuit 120 through a switch 236 set in the slow motion reproducing position SLP. From the output of the amplifier 121 the pulses are applied through switches 111 and 112 to the servo amplifier 110. Control of the brake is as described before using the signals from pickup coil 128. Under the control of the slow motion servo system, the period $t_1$ from said first trace of the main head, e.g. 137, in the same track to the time when the same main head traces the guard band adjacent to said same track will be kept constant.

In slow motion reproduction, the induced standard control signals across the control head 119 are reproduced as a series of pulses of $(30/n)$ Hz/sec (where $n$ is slow down ratio of tape speed) and indicate the first trace of the $n$ times retrace on the same track because of co-phasal relationship between the standard control signals and the slow motion control signals. These standard control signals are applied through switch 218 set in SLP and the circuits 217,222,223 and 207 to control a second switching circuit 136.

During slow motion reproduction it is expected theoretically that the best slow motion picture will be obtained if the output signals of a slow motion subhead such as 241 tracing fully on a track, position S-4 of FIG. 9A, are substituted for the output signals from the main head tracing the guard band, position M-4. In practice, however, it has been found that this is not entirely correct due to mixing and switching noise. Instead, it has been found that better results are obtained if the output signals from the subhead are substituted for those of a main head for a period of from ⅓ to ½ of the scanning time both before and after the main head is in the guard band position M-4. Thus, for example, the output signals of the subhead are used for a time corresponding to $S_3$, $S_4$ and $S_5$ on FIG. 9A. The exact time is selected by adjusting the delay of the time delay circuits 222 and 223. This time is set, for example, to be a time of ⅓ to ½ of a period corresponding to one field preceding the field at the time when the slow motion main head traces the guard band to ⅓ to ½ of a period corresponding to one field after the end of the tracing of the slow motion main head in the guard band. This operation is controlled by the trigger output of said multivibrator 207.

No switching noises arise during the switching time, because the beginning and end of the subhead switching period is selected in such a relation mentioned above that after the output of one main head is switched into that of the subhead, in the next retrace of the track the other main head will switch on before the subhead is tracing the guard band most fully.

The output signals from the main and subheads produced by the second switching circuit are further composed in a first switching circuit 135 at such period preceding several horizontal trace terms to the following blanking period, with the pulses induced across a pair of detecting coils 191,192 adjacent to the rotary plane of magnetic pieces mounted on said disc 106 at its arm. In slow motion reproduction as well as still image reproduction, the path of the tape around said guide cylinder is adjusted to compensate the tracking error with said tracking error compensating device.

4. STILL IMAGE REPRODUCE (ST)

For still image reproduction, the tape is stopped. The output signal of a crystal oscillator 131 is connected to a frequency dividing circuit 132, the output of which is connected through a switch 133 and the switch 112, set in the dotted line (ST) position to the servo amplifier 110 and the error detector 102 operating the brake 115. In this case, the output of the frequency dividing circuit 132 is used as a standard control signal. The reference signal will again be that produced by pickup coil 107 and magnetic piece 105.

In still image reproduction the transportation of the tape is ceased with moderate tension preferably applied to the tape around said guide cylinder 6 and the tape is adjusted a bit to the direction of its path. The rotary phases of the heads are controlled referring the output of the frequency dividing circuit 132 provided to the servo amplifier circuit 110 through switches 112 and 133 set in the still reproducing position ST, so that repeated retrace in the same track on the tape provides a complete still image.

DETAILED CIRCUIT DESCRIPTION

The switching system 101 comprises the first switching circuit 135 which composes reproduced signals of both main heads 48,49 of the field skip system into continuous video signals during normal speed playback (SDR) in response to sequential pulses from the detecting coils 191 and 192. The coils 191 and 192 produce pulses in response to magnetic pieces, of a number corresponding to the main heads. Thus, if there are two main heads there are two such pieces which are spaced to produce pulses corresponding to the end of a field, usually at several horizontal retrace times prior to the blanking period at the end of a field.

A second switching circuit 136 composes signals reproduced by both the first main head 48 or 10 (in the full field) and first subhead 50 or 46 (in the full field) operating in place of the first main head, into continuous video signals at the time when the first main head traces in a guard band between adjacent recorded tracks. The second switching circuit 136 cooperates with the first switching circuit 135.

A preferred form of first switching circuit 135 is shown in FIG. 7 wherein numerals 137 and 138 represent the first and second main heads respectively, and numerals 139, 140 and 141 represent three pairs of slip rings and brushes connecting the respective signal terminals of the main heads and input terminals 142,143 of input transformers 144,145, and the common terminals of both main heads 146 and terminal 147 of the input transformer for matching impedance. For the measurement and adjustment of the frequency response of said main heads, a resistor 148 is connected between the common terminal 149 of the input transformer 145 and the reference potential terminal 150. The resistor 148 is shunted by a lead wire during normal use of the system.

Each secondary winding 151 and 152 of the input transformers 144 and 145 is shunted with a respective capacitor 153,154 to produce resonance at a frequency to compensate the response of the main heads 137,138. The resonant circuits so formed also have respective adjustable shunting resistors 155,156. The output terminal 157 of the transformer 144 is connected directly to a preamplifier 158, and the output terminal 159 of said transformer 145 is coupled directly to a preamplifier 160. The preamplifier 158 comprises three direct coupled transistor amplifiers 161,162,163 of three different types, common emitter, common base and common collector in series order. The preamplifier 160 comprises three direct coupled transistor amplifiers 164,165,166 of three types in the same series order.

The first switching circuit 135 has a pair of common emitter connected transistors 167,168, each having respective emitter electrodes 169, 170 and collector electrodes 171,172. The emitter or collector electrode of each transistor 167,168 is separably shunted by a pair of switching transistors 173,174. The switching transistors 173,174 are respectively triggered by output pulses from pulse amplifiers 175*a*, 175*b*. The output signals from the collectors of both transistors 167,168 which are the video signals of the two main heads, are mixed and applied to the base electrode of a common collector connected transistor 176. The base 177 of transistor 167 is connected to receive signals from the emitter of transistor 163 through a coupling capacitor 178 and the center tap 179 of a variable resistor 180 whose ends are connected between a terminal of an emitter resistor 181 of transistor 163 shunted with a capacitor 182 and a common (ground) terminal. The base 183 of transistor 168 is connected to the emitter of transistor 166 through a coupling capacitor 184 and the center tap 185 of a variable resistor 186 through a pair of switches 189,190 located in the position shown. The fixed two terminals of variable resistor 186 are connected between a terminal of the emitter resistor 187 of transistor 166, which is shunted by a capacitor 188, and ground.

Elements 191 and 192 represent a pair of detecting coils cooperating with a pair of magnetic pieces disposed symmetrically on the periphery of the disc 106. Pulses detected by the coils 191,192 are respectively provided to the base electrodes of first stage pulse amplifiers 193,194. The detected signals from amplifiers 193,194 pass through respective diodes 195,196 to second stage transistor amplifiers 197,198 to trigger the respective switching transistors 173,174.

For standard speed reproduction the switches 189,190 are left in the positions (SDP) shown. There will be alternate switching of one main head to the next. For slow motion reproducing (SLP) operation, the switches 189 and 190 are set to the dotted line FS position and the second switching circuit comes into play.

The second switching circuit 136 of FIG. 6 and the circuits embodying the present invention are exemplarily disclosed in FIG. 8, and comprises a pair of common emitter connected transistors 199,200 having respective emitter electrodes 201,202 and collector electrodes 203,204. The two transistors 199 and 200 are each shunted by a pair of switching transistors 205,206 whose base electrodes are triggered by a flip-flop circuit 207 for pulse waveform shaping.

The base 208 of transistor 199 is connected to the emitter of a transistor 246 through a coupling capacitor 209 and a center tap 210 of a variable resistor 211 which is connected between a terminal of emitter resistor 212 of transistor 246 and ground. Emitter resistor 212 is shunted by a capacitor 213. The base 214 of transistor 200 is coupled to the emitter of transistor 166 (FIG. 7) through a coupling condenser 215, the series connected switches 189,216 (FIG. 7) to the center tap 185 of the variable resistor 186.

With switch 218 of FIG. 6 set in the slow motion reproduction position SLP output signals of the control head 119 described above in FIG. 6, are applied to a preamplifier 217 of an RC (resistance capacitance) coupled common emitter amplifier. As indicated previously, the occurrence of a signal at the preamplifier 217 indicates the beginning of a trace on the tape which is coincident with a standard control signal and indicates the first time that a main head should be scanning that trace. The block 217 is shown in FIG. 6 and the detailed circuit in FIG. 8, upper left corner. Output signals from preamplifier 217 are detected into pulses of one polarity by a transistor detector 219 (FIG. 8) and applied to a clamp circuit 220 having a variable resistor 221 to set the clamp level. First and second time delay circuits 222,223 are connected in tandem and comprise a pair of cascaded monostable multivibrators 224,225 connected by a clamp circuit 226. Adjustable level noise clipper diodes 277,228 are in the outputs of the respective multivibrators connected to the collector electrodes of the left hand transistor of each multivibrator. The cross couplings of the multivibrators include capacitors 231*a* and 231*b*, and adjustable resistors 229,230, which are set to provide adjustment of the active or "on" intervals of each of the multivibrators.

The "on" duration $t_1$ of the monostable multivibrator 224 is so adjusted with the cross coupling resistor 229 that it determines the switching point of the second switching circuit of each retracing period in the recorded track in slow motion reproduction. In other words, the duration $t_1$ means the period from the time when one of the main heads 137 or 138 traces the same track at the first time to the time preceding one-half to one-third field to the time when the main head traces the guard band adjacent said track, where the subhead 241 should trace completely the track and its signals used. The end of the "on" duration $t_2$ of the monostable multivibrator 225 is also adjusted in such relation with the cross coupling resistor 230 that it decides the period where output signals of said subhead are dropped off instead of the output of said main head.

The signals from the subhead 241 are amplified by amplifiers 244,245,246. The output of the emitter follower 246 is tapped off emitter resistor 211, applied to the base of amplifier 199 whose collector is connected to the base of emitter follower buffer amplifier 247.

Signals from the emitter follower buffer amplifier 247, which are the output signals from the subhead 241 amplified by the preamplifier 245 are applied through switch 190 (FIG. 7) to the base of transistor 168 of the first switching circuit. Signals from the main head 138 of FIG. 6, are applied through the amplifier 160 to the second switching circuit of FIG. 8 through the switches 216,189 to the amplifier 200. The collector of transistor 200 is connected to the base of buffer amplifier 247. The two amplifiers 199, which receives the subhead signals, and 200, which receives the main head signals are shunted by the respective switching transistors 205,206. Depending upon the conduction of the two transistors 205,206, either the subhead signals or main head signals will be applied to transistor 247 and thence to the transistor 168 (FIG. 7) and the buffer transistor 176 which is the output of the circuit.

In FIG. 8, output pulses from the second time delay circuit 223 are applied to the base of transistors 232 forming the trigger multivibrator 207 to shape the waveform of the pulses to shift the second switching circuit. The outputs of the collectors of the two transistors of the multivibrator 207 are connected to the base electrodes of transistors 205,206. Depending upon the state of multivibrator 207 one or the other of transistors 205,206 is conducting. The non-conducting transistor 205,206 permits the signals applied to the transistor 199 or 200 to be passed to transistor 247 and thence to the first switching circuit buffer amplifier over switch 190. As should be apparent, setting the periods of multivibrators 222,223 determines when the subhead signal is switched into or out of the circuit to buffer amplifier 176.

In the description above accompanying the FIGS. 6 and 8, it is explained that the system embodies only one slow motion subhead 241 corresponding to the main head 138. But it will be easily understood that the schematic diagram will be constructed symmetrically with the other subhead connected to the third switching circuit, through the other preamplifier, interconnected between said preamplifier 158 and said first switching circuit 135, through some switches corresponding to said switches 189, 190 and 216.

What is claimed is:

1. In a magnetic tape video recorder and reproducer system in which video signals originally recorded on substantially parallel tracks on the tape are to be reproduced in slow motion at a speed of $1/n$ the standard speed at which said video signals were originally recorded, the combination comprising means for recording the video signals on said substantially parallel tracks as the tape is moving at the standard speed, said recording means including at least one recording head and means for rotating the head relative to the magnetic tape, means for recording on a track separate from said tracks on which said video signals are recorded first and second control signals with said second control signals having a repetition rate of $n$ times said first control signals, servo means responsive to said recorded first control signals for controlling the relative phase of said rotating means with respect to the recorded video signals during reproduction of the recorded video signal at standard speed and responsive to said recorded second control signals when the tape is moving at a speed $1/n$ of the standard speed during slow motion reproduction, means for reproducing the recorded signals in slow motion including a pair of heads which are rotated by said rotating means to trace a recorded track of the video signal $n$ times during a given period of time, said pair of heads being in complementary relationship with each other so that one head of the pair traces at least a portion of a track while the other head traces at least a portion of the guard band adjacent said track during each trace of said predetermined period, timing means including means responsive to the recorded first control signals which are reproduced at $1/n$ of the original rate of recording during slow motion reproduction, and switching means connected to said timing means and responsive thereto to switch the heads of the pair to produce an output signal at the appropriate times when a respective head of the pair is to be tracing more on a said track than the other head of the pair.

2. A system as in claim 1, wherein said timing means operates said switching means to switch the heads when both heads of a pair are off the tape.

3. A system as in claim 1, wherein each said first control signal detected from said tape initiates the operation of the timing means for a period during which the set of heads traces the tape $n$ times.

4. A system as in claim 1, wherein said switching means operates to switch a head into operation to produce an output signal at a time corresponding from between one-third to one-half of the time that it takes said head to trace a track on the tape.

5. A system as in claim 1, wherein said switching means operates to hold a head switched into operation to produce an output signal for a time corresponding from between one-third to one-half of the time that it took said head to trace a track.

6. A system as in claim 1, wherein each track of information recorded on the tape contains one field of video information.

7. A system as in claim 1, further comprising means for shifting the position of the tape with respect to the heads of a pair of heads so that the heads trace paths which are more nearly parallel with the recorded tracks, said shifting means including means for engaging an edge of the tape and for moving the tape relative to the path travelled by said pair of heads.

8. A reproducer as in claim 7, further comprising servo means responsive to the detected timing signals for controlling said means for rotating said heads.

9. A system as in claim 1, further comprising a second pair of heads arranged in a complementary relationship, said timing means operating said switching means to switch between the heads of a respective pair when one said pair is off the tape and the other pair is on the tape.

10. A system as in claim 9, further comprising means for shifting the position of the tape with respect to the heads of a pair of heads so that the heads trace paths which are more nearly parallel with the recorded tracks, said shifting means including means for engaging an edge of the tape and for moving the tape relative to the path travelled by said pair of heads.

11. A system as in claim 9, wherein said switching means operates to switch a head into operation to produce an output signal at a time corresponding from between one-third to one-half of the time that it takes said head to trace a track on the tape.

12. A system as in claim 9, wherein said switching means operates to hold a head switched into operation to produce an output signal for a time corresponding from between one-third to one-half of the time that it took said head to trace a track.

13. A system as in claim 9, wherein each track of information recorded on the tape contains one field of video information.

* * * * *